US012632591B2

(12) United States Patent (10) Patent No.: US 12,632,591 B2
Ezra et al. (45) Date of Patent: May 19, 2026

(54) SENSITIVE DATA RECLASSIFICATION ENGINE IN A SECURITY MANAGEMENT SYSTEM

(71) Applicant: Microsoft Technology Licensing, LLC, Redmond, WA (US)

(72) Inventors: Shimon Ezra, Petach Tikva (IL); Andrey Karpovsky, Kiryat Motzkin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 18/318,967

(22) Filed: May 17, 2023

(65) Prior Publication Data

US 2024/0386132 A1 Nov. 21, 2024

(51) Int. Cl.
*G06F 21/62* (2013.01)
*G06F 16/28* (2019.01)

(52) U.S. Cl.
CPC ........ *G06F 21/6245* (2013.01); *G06F 16/285* (2019.01)

(58) Field of Classification Search
None
See application file for complete search history.

(56) References Cited

U.S. PATENT DOCUMENTS 11,704,431 B2 * 7/2023 Kraus ................. H04L 63/0414
726/26
12,153,693 B2 * 11/2024 Williamson .......... G06F 21/604

2015/0326601 A1 11/2015 Grondin
2018/0352005 A1 * 12/2018 Gaddam ............... H04L 63/205
2020/0125746 A1 * 4/2020 Joshi ................... G06F 21/6245
2021/0004471 A1 1/2021 Brannon
(Continued)

FOREIGN PATENT DOCUMENTS

CN 117195297 B * 4/2024

OTHER PUBLICATIONS

International Search Report and Written Opinion received for PCT Application No. PCT/US2024/028098, Sep. 10, 2024, 17 pages.
(Continued)

*Primary Examiner* — Jeffrey R Swearingen
(74) *Attorney, Agent, or Firm* — Shook, Hardy & Bacon L.L.P.

(57) ABSTRACT

Methods, systems, and computer storage media for providing data security posture management using a sensitive data reclassification engine in a security management system. Data security posture management provides security operations—including identifying and remediating risk exposure—to securely manage data, resources, and workloads. In operation, sensitive data scan results are accessed. A scanned data item having a first data sensitivity confidence score—and a first data classification that indicates that the scanned data item is a potentially sensitive data item—is identified in the sensitive data scan results. Based on the scanned data item having the first data classification, scanned metadata comprising a sensitive data attribute is accessed. Based on a second data sensitivity confidence score associated with the sensitive data attribute and the scanned data item, the first data classification is replaced with a second data classification that indicates that the scanned data item is a sensitive data item.

20 Claims, 10 Drawing Sheets

(56)                    References Cited

U.S. PATENT DOCUMENTS

| | | | |
|---|---|---|---|
| 2021/0026872 A1* | 1/2021 | Saillet .................. | G06F 16/248 |
| 2022/0207163 A1* | 6/2022 | Gentleman ............ | G06F 21/62 |
| 2023/0087093 A1 | 3/2023 | Ithal | |
| 2023/0195755 A1* | 6/2023 | Raghavan .......... | G06F 21/6245 |
| | | | 707/737 |
| 2024/0005032 A1* | 1/2024 | Phokela ............... | G06F 21/577 |
| 2024/0143831 A1* | 5/2024 | Bryan ................. | G06F 21/6245 |
| 2024/0323216 A1* | 9/2024 | Gershanov ........... | G06F 21/577 |

OTHER PUBLICATIONS

International Preliminary Report on Patentability (Chapter I) received for PCT Application No. PCT/US2024/028098, Mailed on Nov. 27, 2025, 11 Pages.

* cited by examiner

SECURITY MANAGEMENT SYSTEM 100A

SENSITIVE DATA SCANNING ENGINE 100C

SENSITIVE DATA IDENTIFICATION MACHINE LEARNING MODEL 102C

SENSITIVE DATA CONFIDENCE SCORING MODEL 104C

SENSITIVE DATA RECLASSIFICATION ENGINE 110

SENSITIVE DATA SCAN RESULTS 110A

SECURITY POSTURE MANAGEMENT ENGINE 120

SECURITY GRAPH API 122

RISK ASSESSMENT OPERATIONS 124

NETWORK 100B

SECURITY MANAGEMENT CLIENT 130

SENSITIVE DATA SCANNING ENGINE CLIENT 132

SECURITY POSTURE INTERFACE DATA 134

FIG. 1A

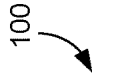
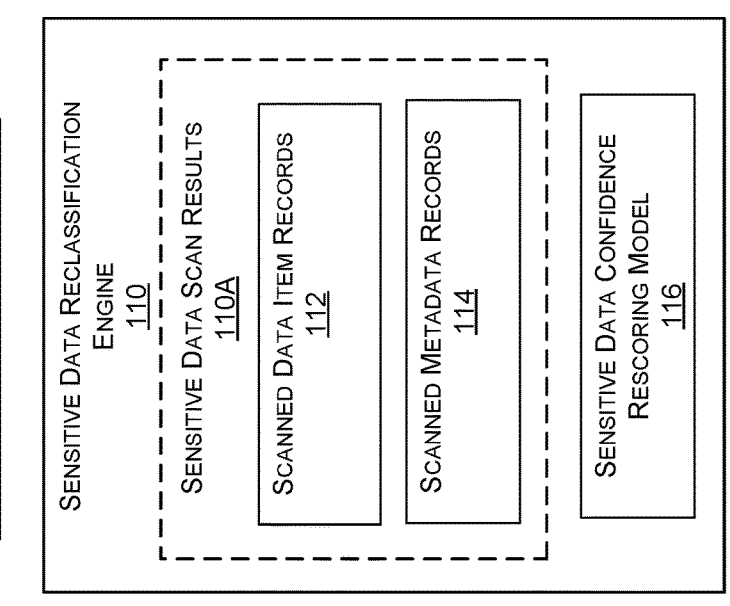
FIG. 1B

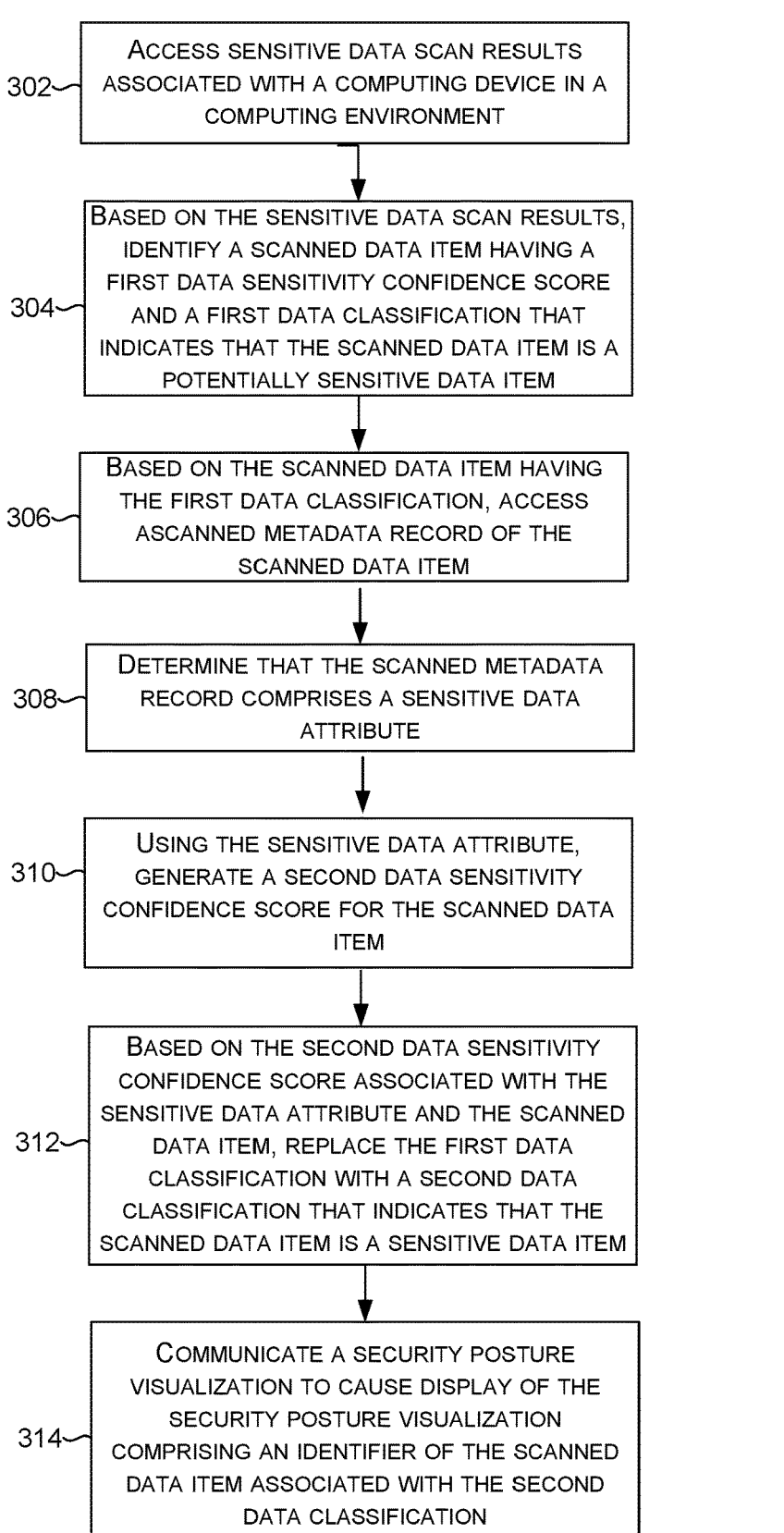

300

302 ACCESS SENSITIVE DATA SCAN RESULTS ASSOCIATED WITH A COMPUTING DEVICE IN A COMPUTING ENVIRONMENT

304 BASED ON THE SENSITIVE DATA SCAN RESULTS, IDENTIFY A SCANNED DATA ITEM HAVING A FIRST DATA SENSITIVITY CONFIDENCE SCORE AND A FIRST DATA CLASSIFICATION THAT INDICATES THAT THE SCANNED DATA ITEM IS A POTENTIALLY SENSITIVE DATA ITEM

306 BASED ON THE SCANNED DATA ITEM HAVING THE FIRST DATA CLASSIFICATION, ACCESS ASCANNED METADATA RECORD OF THE SCANNED DATA ITEM

308 DETERMINE THAT THE SCANNED METADATA RECORD COMPRISES A SENSITIVE DATA ATTRIBUTE

310 USING THE SENSITIVE DATA ATTRIBUTE, GENERATE A SECOND DATA SENSITIVITY CONFIDENCE SCORE FOR THE SCANNED DATA ITEM

312 BASED ON THE SECOND DATA SENSITIVITY CONFIDENCE SCORE ASSOCIATED WITH THE SENSITIVE DATA ATTRIBUTE AND THE SCANNED DATA ITEM, REPLACE THE FIRST DATA CLASSIFICATION WITH A SECOND DATA CLASSIFICATION THAT INDICATES THAT THE SCANNED DATA ITEM IS A SENSITIVE DATA ITEM

314 COMMUNICATE A SECURITY POSTURE VISUALIZATION TO CAUSE DISPLAY OF THE SECURITY POSTURE VISUALIZATION COMPRISING AN IDENTIFIER OF THE SCANNED DATA ITEM ASSOCIATED WITH THE SECOND DATA CLASSIFICATION

FIG. 3

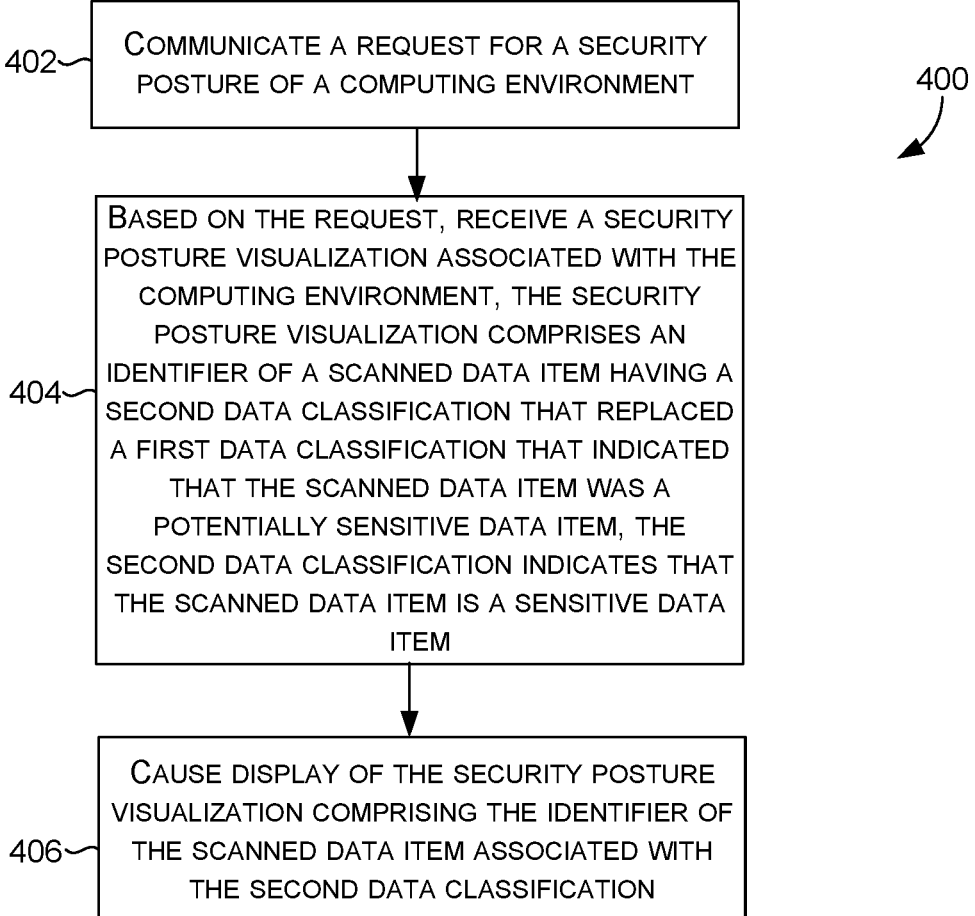

402 — COMMUNICATE A REQUEST FOR A SECURITY POSTURE OF A COMPUTING ENVIRONMENT

400

404 — BASED ON THE REQUEST, RECEIVE A SECURITY POSTURE VISUALIZATION ASSOCIATED WITH THE COMPUTING ENVIRONMENT, THE SECURITY POSTURE VISUALIZATION COMPRISES AN IDENTIFIER OF A SCANNED DATA ITEM HAVING A SECOND DATA CLASSIFICATION THAT REPLACED A FIRST DATA CLASSIFICATION THAT INDICATED THAT THE SCANNED DATA ITEM WAS A POTENTIALLY SENSITIVE DATA ITEM, THE SECOND DATA CLASSIFICATION INDICATES THAT THE SCANNED DATA ITEM IS A SENSITIVE DATA ITEM

406 — CAUSE DISPLAY OF THE SECURITY POSTURE VISUALIZATION COMPRISING THE IDENTIFIER OF THE SCANNED DATA ITEM ASSOCIATED WITH THE SECOND DATA CLASSIFICATION

FIG. 4

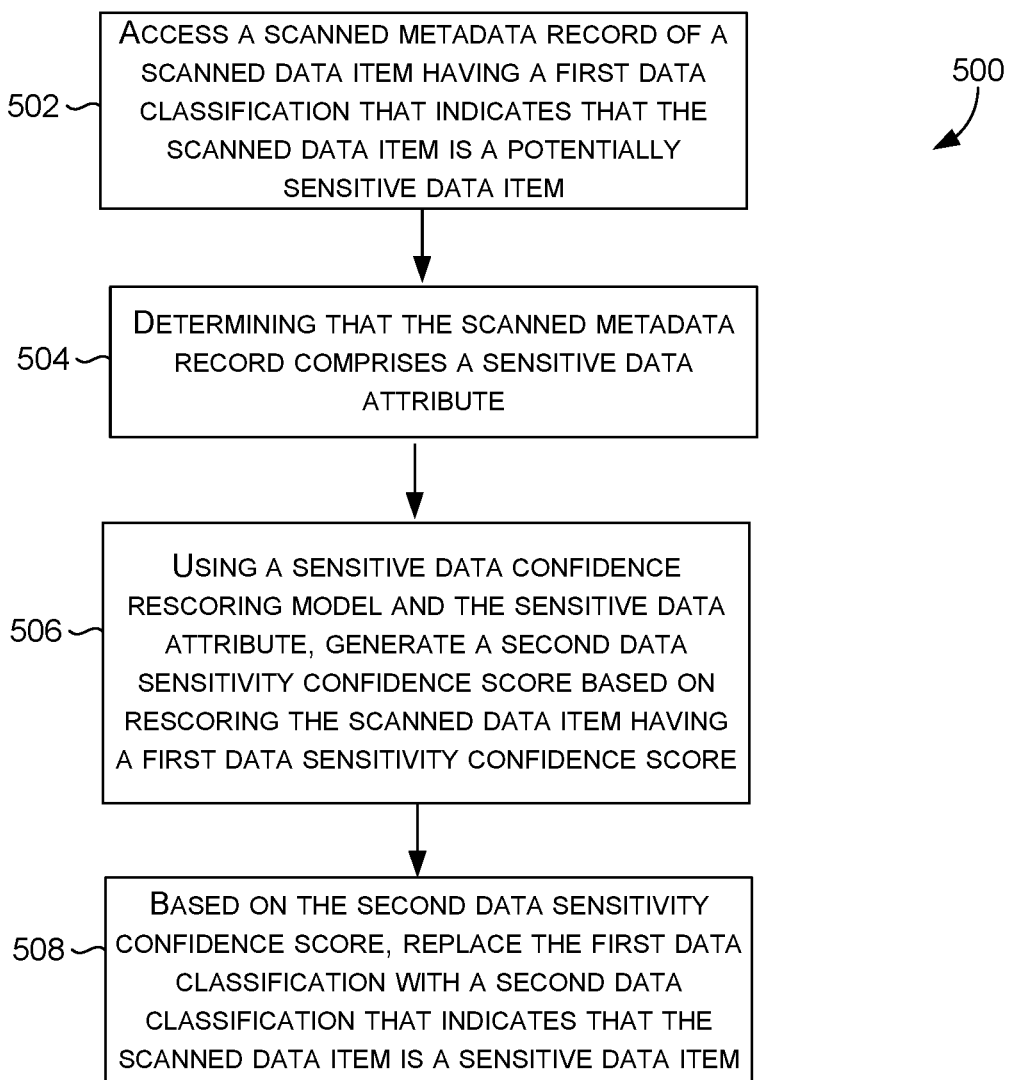

500

502 — ACCESS A SCANNED METADATA RECORD OF A SCANNED DATA ITEM HAVING A FIRST DATA CLASSIFICATION THAT INDICATES THAT THE SCANNED DATA ITEM IS A POTENTIALLY SENSITIVE DATA ITEM

504 — DETERMINING THAT THE SCANNED METADATA RECORD COMPRISES A SENSITIVE DATA ATTRIBUTE

506 — USING A SENSITIVE DATA CONFIDENCE RESCORING MODEL AND THE SENSITIVE DATA ATTRIBUTE, GENERATE A SECOND DATA SENSITIVITY CONFIDENCE SCORE BASED ON RESCORING THE SCANNED DATA ITEM HAVING A FIRST DATA SENSITIVITY CONFIDENCE SCORE

508 — BASED ON THE SECOND DATA SENSITIVITY CONFIDENCE SCORE, REPLACE THE FIRST DATA CLASSIFICATION WITH A SECOND DATA CLASSIFICATION THAT INDICATES THAT THE SCANNED DATA ITEM IS A SENSITIVE DATA ITEM

SENSITIVE DATA RECLASSIFICATION ENGINE IN A SECURITY MANAGEMENT SYSTEM

BACKGROUND

Users rely on computing environments with applications and services to accomplish computing tasks. Distributed computing systems host and support different types of applications and services in managed computing environments. In particular, computing environments can implement a security management system that provides security posture management functionality and supports threat protection in the computing environments. For example, data security posture management (DSPM), cloud security posture management (CSPM) and enterprise security posture management (collectively "security posture management") can include the following: identifying and remediating risk by automating visibility, executing uninterrupted monitoring and threat detection, and providing remediation workflows to search for misconfigurations across diverse cloud computing environments and infrastructure.

SUMMARY

Various aspects of the technology described herein are generally directed to systems, methods, and computer storage media for, among other things, providing security posture management using a sensitive data reclassification engine of a security management system. Security posture management supports management of security aspects of data, resources, and workloads in computing environments including identifying and remediating risk. Security posture management can be provided based on sensitive data scanning that includes searching for identifying, classifying, and reclassifying sensitive (or confidential) information within data (e.g., files, documents, or systems) of an organization.

The sensitive data reclassification engine operates to provide security posture management based on evaluating scanned metadata associated with a scanned data item and determining whether to change a data classification assigned to the scanned data item. For example, a security administrator can request security posture information of a computing environment, and the security posture information is provided based in part on sensitive data reclassification operations. In particular, the sensitive data reclassification operations identify a scanned data item with a first data classification that indicates that the scanned data item a potentially sensitive data item and update the first data classification to a second data classification that indicates that the scanned data item is a sensitive data item. Updating the data classification of the scanned data item is based in part on evaluating different types of scanned metadata of the scanned data item and rescoring a data sensitivity confidence score of the scanned data item.

Conventionally, security management systems are not configured with a comprehensive computing logic and infrastructure to comprehensively evaluate sensitivity of content. For example, heuristic approaches can be used in security management systems to determine sensitivity of data without additional data sensitivity reclassification—for example, using supplemental information associated the data. Such security management systems lack integration with sensitive data reclassification operations that improve the accuracy of identifying sensitive or confidential content. Merely implementing heuristic approaches for identifying sensitive data—without additional data sensitivity reclassification based on metadata—causes deficient functioning of the security management system. For example, a deficient security posture interface does not adequately present the security posture information in a manner that accurately indicates the security posture of a computing environment. Moreover, without accurate data classification of data items, potential threats can become actual threats which can lead to unauthorized access to data in the computing environment and malicious operations in the computing environment.

A technical solution—to the limitations of conventional security management systems—can include the challenge of providing data and metadata scanning and rescoring of data sensitivity confidence scores for data items based on sensitive data attributes of metadata—and providing security management operations and interfaces via a sensitive data reclassification engine in a security management system. As such, the security management system can be improved based on sensitive data reclassification operations that operate to effectively determine and provide security posture information of a computing environment in a particular manner.

In operation, sensitive data scan results associated with a computing device in a computing environment are accessed. A scanned data item is identified using the sensitive data scan results. The scanned data item has a first data sensitivity confidence score and a first data classification that indicates the scanned data item is a potentially sensitive data item. Based on the scanned data item having the first data classification, a scanned metadata record of the scanned data item is accessed. A determination that the scanned metadata record comprises a sensitive data attribute is made. Using a sensitive data attribute, a second data sensitivity confidence score for the scanned data item is generated. Based on the second data sensitivity confidence score, the first data classification is replaced with a second data classification that indicates the scanned data item is a sensitive data item. A security posture visualization is communicated to cause display of the security posture visualization comprising the scanned data item associated with the second data classification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1A and 1B are block diagrams of an exemplary security management system that includes a sensitive data reclassification engine, in accordance with aspects of the technology described herein;

FIG. 3 provides a first exemplary method of providing security posture management using a sensitive data reclassification engine, in accordance with aspects of the technology described herein;

FIG. 4 provides a second exemplary method of providing security posture management using a sensitive data reclassification engine, in accordance with aspects of the technology described herein;

FIG. 5 provides a third exemplary method of providing security posture management using a sensitive data reclassification engine, in accordance with aspects of the technology described herein;

DETAILED DESCRIPTION

Overview

Figure 1C:
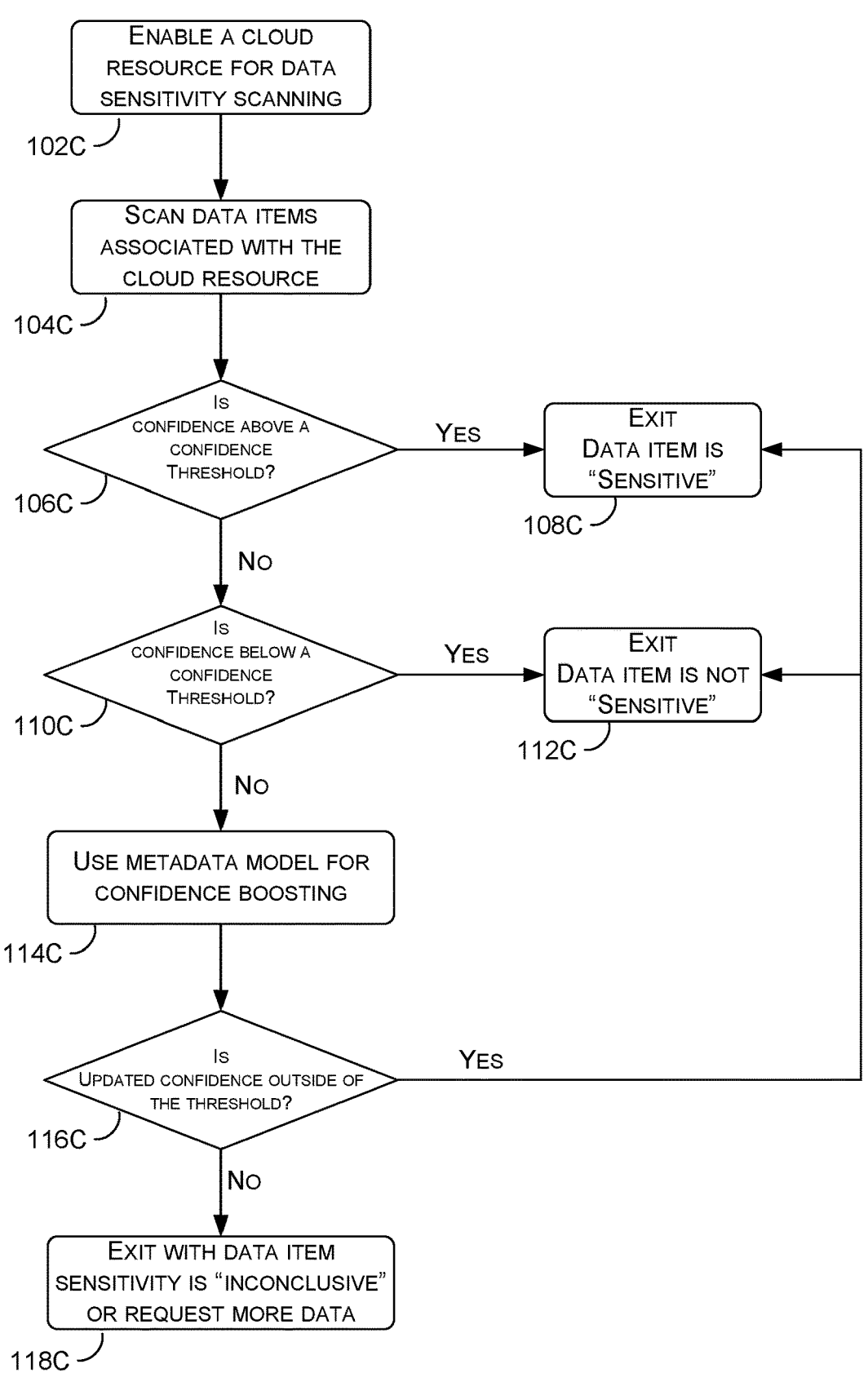
FIG. 1C is a flow diagram associated with a sensitive data classification engine, in accordance with aspects of the technology described herein.

A security management system supports management of security aspects of data, resources, and workloads in computing environments. The security management system can help enable protection against threats, help reduce risk across different types of computing environments, and help strengthen a security posture of computing environments (i.e., security status and remediation action recommendations for computing resources including networks and devices). For example, the security management system can provide real-time security alerts, centralize insights for different resources, and provide for preventative protection, post-breach detection, and automated investigation, and response. The security management system can support providing security posture management (e.g., data security posture management—DSPM), with security management operations that secure data by ensuring sensitive data has appropriate data security posture regardless of where it is stored or moved to.

Conventionally, security management systems are not configured with a comprehensive computing logic and infrastructure to effectively evaluate sensitivity of content. For example, heuristic approaches can be used in security management systems to determine sensitivity of data without additional data sensitivity reclassification based on supplemental information associated the data. In particular, when scanning files for sensitive content, a Regular Expression (regex) approach can be used to match and manipulate text based on specific patterns and rules; and alternatively, a list of known sensitive data item patterns defined and identified in content. For example, a string consisting of 4 numbers between 0-255, separated by dots—such as "104.20.200.13"—can represent an IP address (which is private information)—or simple code or index with a similar pattern.

However, heuristic approaches may have several shortcomings, including: limited scope—designed to address specific types of problems; vulnerability to evasion—can be bypassed or evaded by attacker who know how the rules work; and lack of accuracy—results may not always be accurate of reliable. For example, when the strings are short or do not have a specific pattern string (e.g., "pwd" can indicate the presence of an access password—which is a sensitive data item—or simply a random string of 3 letters). Such security management systems lack integration with sensitive specific data reclassification operations that improve the accuracy of identifying sensitive or confident content.

Merely implementing heuristic approaches for identifying sensitive data—without additional data sensitivity reclassification based on supplemental data (e.g., metadata)—causes deficient functioning of the security management system. For example, false positives occur when the security management system flags an event or alert as suspicious or malicious when it is actually benign. If not properly identified, false positives can result in wasting computing time and other computing resources investigating and responding to events that do not pose an actual threat. By determining false positives, security teams can improve the accuracy of their detection and response processes, reducing the risk of missed threats and enabling more efficient use of resources.

An estimated probability of a false positive of a heuristic approach can be determined by modeling random generation of words. This can be done using a known distribution (e.g., Zipfian distribution) of letters or n-grams in large corpus configured to decrease when the length and the uniqueness of the word increases. This probability can be reflected in a confidence value provided together with scan results, but this is only a half-measure. Low accuracy (both recall and precision) can be very detrimental when relying on scan results when providing security posture information of a computing environment. For example, a deficient security posture interface does not adequately present the security posture information in a manner that accurately indicates the security posture of a computing environment. Moreover, without accurate data classification of data items, potential threats can become actual threats which can lead to unauthorized access to data in the computing environment and malicious operations in the computing environment. As such, a more comprehensive security management system— with an alternative basis for performing security management operations—can improve computing operations and interfaces for securing management.

Embodiments of the present technical solution are directed to systems, methods, and computer storage media, for among other things, providing security posture management using a sensitive data reclassification engine of a security management system. Security posture management supports management of security aspects of data, resources, and workloads in computing environments including identifying and remediating risk. Security posture management can be provided based on sensitive data scanning that includes searching for identifying, classifying, and reclassifying sensitive or confidential information within data (e.g., files, documents, or systems) of an organization. Security posture management is provided using the sensitive data reclassification engine that is operationally integrated into the security management system. The security management system supports a sensitive data reclassification framework of computing components associated with processing sensitive data for determining a security posture of a computing environment.

The sensitive data reclassification engine operates to provide security posture management based on evaluating scanned metadata associated with a scanned data item and determining whether to change a data classification assigned to the scanned data item. For example, a security administrator can request security posture information of a computing environment, and the security posture information is provided based on sensitive data reclassification operations. In particular, the sensitive data reclassification operations identify a scanned data item with a first data classification (e.g., a first data classification that indicates that the scanned data item is a potentially sensitive data item) and update the first data classification to a second data classification (e.g., a second data classification that indicates that the scanned data item is a sensitive data item; or a second data classification that indicates that the scanned data item is a non-sensitive data item). Updating the data classification of the scanned data item is based in part on evaluating different types of scanned metadata of the scanned data item and rescoring a data sensitivity confidence score of the scanned data item.

At a high level, the security management system supports sensitive data reclassification operations associated with providing security posture information for a computing environment based on reclassifying a data classification of scanned sensitive data items. By way of context, a cloud computing system can manage different types of content is presented in a meaningful context. Content is provided based on data that is organized, presented, and delivered to users. Data can be stored as files or data BLOBs in a cloud storage. A data item record or a scanned data item record can refer to a data item, a portion of a data item, or a data identifier of data. A data item can refer to the data itself (e.g., a file) or a portion of the data item (e.g., text data of a file), and a data identifier can refer to a representation of the data item (e.g., a name of a data item). As such, a data can be communicated as the data itself, a portion of the data, or a data identifier.

Data can be classified, using a data classification process of categorizing data based on its sensitivity. This involves identifying the different types of data, determining the level of sensitivity for each type of data, and then applying appropriate security controls to protect the data according to its classification. Data classification can help organizations comply with regulatory requirements, protect their sensitive information, and prioritize their security efforts. Common classifications for data include public, internal use, confidential, and highly confidential.

Data classification can facilitate security posture management (e.g., DSPM). Security posture management can involve using tools and processes to monitor, measure, and analyze an organization's data security controls, policies, and practices to identify and remediate vulnerabilities and threats to data security. Security posture management typically includes a range of activities, such as regular security assessments and audits, vulnerability scanning and penetration testing, compliance monitoring, and incident response planning. The goal of security posture management is to maintain a strong and effective security posture that can protect sensitive data from unauthorized access, theft, or compromise.

Security posture management can include sensitive data scanning involving scanning cloud computing resources (e.g., storage, systems and networks) to identify sensitive or confidential information that may be at risk of exposure, such as personally identifiable information (PII), financial information, or health information. The scanning operations can be performed using a sensitive data scanning engine that is a specialized tool that search through data (e.g., files, databases, and other digital assets) for specific types of sensitive data. Sensitive data scanning can include scanning for different instances of metadata types. The sensitive data scanning can generate sensitive data scan results.

The sensitive data scanning engine can support sensitive data scanning and further implement a sensitive data reclassification engine to help improve the accuracy (e.g., via a confidence score) of verdicts of scans, and when applicable an increased confidence score. The sensitive data scan can be performed and scan results generated for scanned data items. A scanned data item can be associated with a scanned data item record, where the scanned data item record includes information associated with scanning the data item. For example, the scanned data item record can include a scanned data item identifier, a pointer to metadata of the scanned data item, a pointer to a location of the scanned data item, or include a copy of the scanned data item.

The scanned data item record can include a confidence score of the scanned data item and a data classification of a scanned data item that is based on a confidences score of the scanned data item. The confidence score can refer to a quantified likelihood that the scanned data item is a sensitive data item. The sensitive data scanning engine can also implement a threshold-based mechanism for assigning data classifications to the scanned data item. For example, the sensitive data scanning engine can include a first threshold (e.g., a high watermark threshold) and a second threshold (e.g., a low watermark threshold). The confidence scores of the scanned data items can be compared to the thresholds in order to assign data classifications (e.g., sensitive data item, non-sensitive data item, or potentially sensitive data item) to the scanned data items. As such, a scanned data item that is identified potentially sensitive can be further evaluated to improve a confidence score for determining whether the scanned data item is sensitive or not sensitive.

By way of example, if a confidence score of a first scanned data item is above a first threshold (e.g., high watermark), the first scanned data item is flagged and identified as a sensitive item. The first scanned data item can have a confidence score above a first threshold when the sensitive item contains numerous occurrences of non-trivial sensitivity results (e.g., sensitive data attributes). A non-trivial sensitive results may refer to designated long and specific patterns that are tagged as non-trivial sensitive results which are identified in the scanned data item. If a confidence score of a second scanned data item is below a second threshold (e.g., low watermark), the second scanned data item is flagged and identified as a non-sensitive data item. And, if a confidence score of a third scanned data item is neither above the first threshold nor below the second threshold, the third scanned data item is flagged as a potentially sensitive item. For example, some scanned data items may have some indications of non-trivial sensitivity results; however the non-trivial sensitivity results are inconclusive. As such, the confidence score is neither above the high watermark nor below the low watermark and lies between the thresholds. For such scanned data items, designated as potentially sensitive data items, metadata can be retrieved to boost a confidence score of the potentially sensitive items. As such, a potentially sensitive item may be upgraded or amended to a sensitive item or remain inconclusive.

By way of context, metadata can refer to information that describes and provides context for other data. Metadata provides information about a particular data set, including information about its content, structure, format, and other characteristics. Metadata can include information, such as the author, date created, date modified, file size, location, and other details about the data. Metadata can be used to organize, manage, and make sense of large amounts of data, and it can also be used to help search and retrieve data efficiently. In some cases, metadata is created automatically by software tools, but it can also be added manually by users. Metadata of a scanned data item can specifically refer to readily-available data that does not require additional scanning of the content associated with the scanned data item.

Metadata can specifically include security-related information (e.g., sensitive data attributes) about data that is used to train a sensitive data confidence rescoring model to re-score the confidence score of a data item associated with the metadata. For example, metadata can include data traffic patterns that are associated with a file, the sensitive data confidence rescoring model is trained on historical data traffic patterns of files, where those historical data traffic patterns are stored in metadata, such that the sensitive data confidence rescoring model is used to generate a new confidence score for the data item based on sensitive data attributes of the metadata.

The sensitive data scanning engine can support scanning and identifying different metadata types, including: explicit tags; actual names; access and data flow patterns; and similar resources. Explicit tags are attached to the scanned data item or its immediate environment. A sensitive data identification machine learning can be maintained as a trained model indicating sensitivity (words which are associated with known sensitive content, such as: "customer", "credit", "banking", "medical", etc.); and non-sensitive content (e.g. "Test", "public"). Actual names of items and resources can be based on dictionaries words or known sensitive content above. Access and data flow patterns can be identified for resources that are highly protected, thus indicating sensitive content, or connected by input/output pipelines to other resources that are known to be sensitive. And with respect to similarity to other resources, even when not connected to other sensitive resources, similarity in names or access patterns can indicates similar nature (e.g. Replicas or parallel instances).

A metadata record or a scanned metadata record can refer to a metadata item, a portion of a metadata item, or a metadata identifier of metadata. Metadata can refer to the metadata itself (e.g., a file) or a portion of the metadata item (e.g., text metadata of a file), and a metadata identifier can refer to a representation of the metadata item (e.g., a name of a metadata item). As such, metadata can be communicated as the metadata itself, a portion of the metadata, or a metadata identifier. As such, if metadata of a scanned data item includes sensitive content (e.g., sensitive data attributes), the confidence score can be boosted. In particular, a sensitive data confidence scoring model for scanned data items can be associated with a sensitive data confidence rescoring model for a scanned data item that is identified as potentially sensitive data item, where the sensitive data confidence rescoring model supports rescoring a confidence score of the scanned sensitive data item identified based on metadata of the scanned sensitive data item. In particular, a sensitive data attribute can be identified in the metadata of the scanned sensitive data item, such that, a confidence score of the scanned sensitive data item is re-scored using the sensitive data confidence rescoring model and the sensitive data attributes of the metadata. By way of example, the sensitive data reclassification engine can be implemented in situations where a scanned data item contains few short string indicates sensitivity (e.g., finding the word "IBAN" in a file named 'salaries.csv' might increase confidence—where "IBAN" can correspond to an International Bank Account Number.

Advantageously, the embodiments of the present technical solution include several inventive features (e.g., operations, systems, engines, and components) associated with a security management system having a sensitive data scanning engine with a sensitive data reclassification engine. The security data scanning engine supports sensitive data reclassification operations that providing data and metadata scanning and rescoring of sensitive data confidence for data items based on sensitive data attributes of metadata—and providing security management operations and interfaces via a sensitive data reclassification engine in a security management system. The sensitive data reclassification operations are a solution to a specific problem (e.g., limitations in comprehensive evaluation of sensitivity of content) in security management. The sensitive data reclassification engine provides ordered combination of operations for identifying potentially sensitive data items and re-scoring confidence scores of the potentially sensitive data items for more accurate confidence scores in a way that improves computing operations in a security management system. Moreover, large amounts of data items that in cloud storage can be filtered and presented with more accurate data classifications in a particular manner that improves user interfaces of the security management system.

Example Systems and Operations

Aspects of the technical solution can be described by way of examples and with reference to FIGS. 1A-1B. FIG. 1A illustrates a cloud computing system (environment) 100 including security management engine 100A; network 100B; security data scanning engine 100C with sensitive data identification machine learning model 102C, sensitive data confidence scoring model 104C, sensitive data reclassification engine 110; security management client with sensitive data scanning engine client 132 and security posture interface data 134; and security posture management engine 120 with security graph API 122 and risk assessment operations 124.

The cloud computing environment 100 provides computing system resources for different types of managed computing environments. For example, the cloud computing environment 100 supports delivery of computing services—including servers, storage, databases, networking, and security intelligence. A plurality of security management clients (e.g., security management client 130) include hardware or software that access resources in the cloud computing environment 100. Security management client 130 can include an application or service that supports client-side functionality associated with cloud computing environment 100. The plurality of security management clients can access computing components of the cloud computing environment 100 via a network (e.g., network 100B) to perform computing operations.

The security management system 100A is designed to provide security management using the sensitive data scanning engine 110. The security management system 100A provides an integrated operating environment based on a security management framework of computing components associated with searching for identifying, classifying, and reclassifying sensitive or confidential information within data (e.g., files, documents, or systems) of an organization. The security management system 100A integrates sensitive data reclassification operations—that provide data and metadata scanning and rescoring of sensitive data confidence for data items based on sensitive data attributes of metadata—into security management operations and interfaces to effectively provide sensitive data information, security posture information and remediation information for a computing environment. For example, a security administrator can request security posture information of a computing environment, and the security posture information is provided based on sensitive data reclassification operations. In particular, the sensitive data reclassification operations identify a scanned data item with a first data classification that indicates that the scanned data item a potentially sensitive data item and update the first data classification to a second data classification that indicates that the scanned data item is a sensitive data item. Updating the data classification of the scanned data item is based in part on evaluating different types of scanned metadata of the scanned data item and rescoring a data sensitivity confidence score of the scanned data item The sensitive data scanning engine 100C is responsible for scanning computing resources. The sensitive data scanning engine 100C can be used to scan a storage component of a computing device or a disk image of the computing device that stores data items. The sensitive data scanning engine 100C scans data items to generate sensitive data scan results 110A. The data items are scanned to identify sensitive (or confidential) data, and assigned a data classification based on the outcome of the scan. Information associated with a scan of a data item is stored in the sensitive data scan results. The sensitive data scanning engine 100C can be provided wholly or partially in a sensitive data scanning engine client (e.g., sensitive data scanning engine client 132). For example, operations performed via the sensitive data scanning engine can be performed using the sensitive data scanning engine client 132 that is deployed on a computing resource. The sensitive data scanning engine 100C can further process the scanned data items using additional components in the sensitive data scanning engine 100C to support classifying and reclassifying the scanned data items.

The sensitive data scanning engine 100C includes the sensitive data identification machine learning model 102C evaluates the scanned data items for sensitive data and the sensitive data confidence scoring 104C that scores—i.e., computes a confidence score—for the sensitivity of data identified in the scanned data item. The sensitive data identification machine learning model 102 is configured to analyze patterns and relationships in data item to identify potentially sensitive information. The sensitive data identification machine learning model 102 is trained on a dataset of known sensitive data to learn what features are most indicative of sensitive data (e.g., specific keyword, data types, or file extensions). For example, the known sensitive data can include data items and metadata and sensitive data attributes that indicate data sensitivity. The sensitive data identification machine learning model 102, once trained, can be used to evaluate data items or metadata to predict whether they contain sensitive information or not. The sensitive data identification machine learning model 102 may use various techniques such as natural language processing (NLP), regular expressions, or statistical methods to identify sensitive data. For example, an NLP-based model may analyze the contents of text fields in a database to identify certain patterns or keywords that indicate sensitive information such as credit card numbers, social security numbers, or personally identifiable information (PII).

The sensitive data confidence scoring model 104C can score the confidence that a particular item is sensitive by calculating the probability or likelihood that the data item belongs to a certain class (e.g., sensitive or non-sensitive). The sensitive data confidence scoring model 104C can use probability estimation or classifications. The sensitive data identification machine learning model 102C is trained dataset on known sensitive and non-sensitive data, it learns patterns and features that differentiate the two classes. These patterns and features can then be used to make predictions on new data items. The output of the sensitive data confidence scoring model 104C for each data item is a probability or score that represents the confidence that the data item belongs to a particular class. As such, data items associated with different confidence scores can be associated with different data classification (e.g., sensitive data item; potentially sensitive data item; or non-sensitive data items). The data classifications can be mapped to portion of a ranged (e.g., 1-10; 1-4 non-sensitive data item, 4-7 potentially sensitive data item, and 7-10 sensitive data item). The sensitive data reclassification engine 110 is responsible for processing the sensitive data scan results 110A to reclassify potentially sensitive data items based on metadata corresponding to the potentially sensitive data items, as discussed in more detail below.

The security posture management engine 120 is responsible for communicating with a security management client 130 having the sensitive data scanning engine client 132 and the security incident interface data 134. The sensitive data scanning engine client 132 supports client-side security management operations for providing security management in the security management system. The sensitive data scanning engine client 132 can support scanning data items, communicating sensitive data scanning results, classifying and reclassifying scanned data items, presenting a security posture visualization including scanned data items, and communicating an indication to perform a remediation action for an alert associated with a scanned data item. As such, the security incident interface data 134 can include data associated with the sensitive data scanning engine 100C, sensitive data reclassification engine 110, and data associated with the security posture management 120 which can be communicated between the sensitive data scanning engine 110C, the security posture management engine 120, and the security management client 130.

The security posture management engine 120 operates to provide visibility to security status of resources in a computing environment. Security posture information can be associated with network, data, and identity resources of a computing environment. Security posture information can include sensitive data scanning information as described herein. Security posture information can specifically include data classifications associated with scanned sensitive data, the data classifications are determined using the sensitive data scanning engine 100C. The security posture management engine 120 includes a security graph API 122 that provides access to a security graph (not shown) and security graph data. The security graph provides telemetry data associated with a plurality of resources in a computing environment. In particular, the telemetry data can be security data that is associated with security providers in a computing environment. The security graph and security graph API 122 can support integrating security alerts from different security providers via an API connector that streams alerts to the security posture management engine 120.

The security posture management engine 120 may assess threats and develop risk scores—using risk assessment operations 124 including attack path analysis—associated with threats and attack paths. An attack path analysis can refer to a graph-based algorithm that scans a cloud security graph to identify exploitable paths that attackers may use to breach a computing environment. The attack path analysis exposes attack paths and suggests remediation actions for issues that would break the attack path and prevent a successful breach. In this way, the attack path analysis help address security issues that pose immediate threat with the greatest potential of being exploited in a computing environment. Other variations and combinations of risk assessment operations are contemplated with embodiments of the present disclosure.

A risk for a data item that is used to generate security posture information can be distinguished from the confidence score of the data item, wherein the confidence score is used to classify (and in some cases reclassify the data item). In particular, a risk score can refer to a numerical value that represents the level of risk associated with a particular security incident associated with the data item. It takes into account various factors such as the likelihood of the event occurring and the potential impact of the event if it does occur. The risk score is used to prioritize actions and allocate resources accordingly. A confidence score, on the other hand, is a measure of the level of confidence that can be placed in a particular assessment or prediction that the data item is sensitive, non-sensitive, or potentially sensitive. It takes into account factors such as the quality and quantity of data available, the accuracy of the analysis methods used, and the expertise of the people involved in the assessment. The confidence score is used to evaluate the reliability of the risk score or other assessment results.

The security posture management engine 120 can further support generating security posture visualizations based on the security posture information including data classifications for scanned data items determined using the sensitive data scanning engine 100C and the sensitive data reclassification engine 1110. Security posture information can further include data classifications for scanned data items, which can be provided in combination with attack path analysis, alerts, and security management information. For example, a security posture visualization can provide data items that were potentially sensitive data items that have been reclassified as sensitive data items as security posture information. The security posture visualizations can provide sensitive data items based on one or more sensitive data information entries in a scanned data item record or a scanned metadata record. For example, the security posture visualization can include a scanned data item identifier or a scanned metadata identifier in the security posture visualization.

The security posture information can be generated based on the data classification associated scanned data items such that security posture information is prioritized and filtered based on the data classification. A prioritization identifier (e.g., high, medium, low) can be provided in the security posture visualization in combination with an alert associated with a security issue. Alternatively, a notification associated with the security management information, security prioritization information or the alert can be communicated. Other variations and combinations of communications associated with the unsecured credential are contemplated with embodiments described herein.

The security management client 130 can support accessing a security posture visualization and causing display of the security posture visualization. The security management client 130 can include a sensitive data scanning engine 132 that supports receiving the security posture interface data 134 from the security management system 110A and causing presentation of the security posture data 134. The security posture interface data 134 can specifically include security posture visualizations associated with data classifications of scanned data items. The secure posture visualization can further include remediation actions associated different alerts—including alerts that are associated with scanned data items.

The security management client 130 can further support executing a remediation action. In particular, the security posture visualization can include a remediation action for an alert associated with a scanned data item. The security management client 130 can receive an indication to perform the remediation action associated with the scanned data item. Based on receiving the indication to execute the remediation action, the security management client 130 can communicate the indication to execute the remediation action to cause execution of the remediation action.

As such, data classifications of scanned data items are generated based on the sensitive data scanning engine 100C and provided with remediation actions that can be selected and communicated to cause the remediation action to be performed. The remediation action can address an actual threat or potential threat associated with the scanned sensitive data item and alert. For example, a remediation action can include off-boarding a computing device, disabling a user, quarantining a file; turning off external email, or running an antivirus scan. Other variations and combinations of security posture visualizations with scanned data item records, scanned metadata records, data classifications, alerts, and remediation actions are contemplated with embodiments described herein.

With reference to FIG. 1B, FIG. 1B illustrates sensitive data reclassification engine 110—having sensitive data identification machine learning model 102C with sensitive data confidence scoring model 104C; sensitive data reclassification engine 110 with sensitive data scan results—including scanned data item records 112, scanned metadata record, and sensitive data confidence rescoring model.

The sensitive data identification machine learning model 102C is responsible for generating confidence scores of data items. The confidence score can refer to a quantified likelihood that the scanned data item is a sensitive data item. The sensitive data confidence scoring model 104C can score the confidence that a particular item is sensitive by calculating the probability or likelihood that the data item belongs to a certain class (e.g., sensitive or non-sensitive). The sensitive data reclassification engine 110 accesses scan data results including corresponding scan scanned data item records 112 and scanned metadata records 114 for data items to support reclassifying data classifications of the data items.

A scanned data item can be associated with a scanned data item record and scanned metadata record. The scanned data item records 112 include information associated with scanning the data items. For example, a scanned data item record 112 can include a scanned data item identifier, a pointer to metadata of the scanned data item, a pointer to a location of the scanned data item, or include a copy of the scanned data item. A scanned data item can be associated with a scanned data item record, where the scanned data item record includes information associated with scanning the data item. For example, a scanned data item record can include a scanned data item identifier, a pointer to metadata of the scanned data item, a pointer to a location of the scanned data item, or include a copy of the scanned data item.

Accessing a scanned data item or scanned data item record may include accessing one or more entries associated with a scanned data item record. For example, accessing the scanned data item may mean accessing an identifier (e.g., file name or unique identifier) or the scanned data item. The scanned data item can be accessed such that the scanned data item (e.g., an identifier of the scanned data item) is provided in a security posture visualization. Scanned metadata and scanned metadata records (e.g., scanned metadata records 114) can operate similarly to the scanned data item and scanned data item records. In particular, the scanned metadata records 114 can specifically include metadata information associated with performing functionality described herein (e.g., rescoring confidence scores based on sensitive data attributes of metadata).

The sensitive data confidence rescoring model 116 is responsible for generating an updated confidence score—similar to the confidence score of the sensitive data confidence scoring model 104C. The updated confidence scores of data items are based on metadata corresponding the data items. The sensitive data confidence rescoring model 116 may operate with the sensitive data identification machine learning model 102C that is trained on datasets of known sensitive and non-sensitive metadata, it learns patterns and features that differentiate the two classes. These patterns and features can then be used to make predictions on new metadata items. The output of the sensitive data confidence scoring model 104C for each data item is a probability or score that represents the confidence that the metadata item belongs to a particular class, and further updates the confidence score of a data item, where the metadata include sensitive data attributes. In this way, sensitive data confidence rescoring model is trained to re-score confidence scores of data items based on metadata of the data items having sensitive data attributes. The metadata with sensitive data attributes operate as an additional factor for update an existing confidence score for a data item.

With reference to FIG. 1C, FIG. 1C illustrates a flow diagram associated with a sensitive data scanning engine having a sensitive data reclassification engine. At step 102C, a cloud resource is enabled for data sensitivity. For example, the cloud resource (e.g., storage, compute, network resource) can be configured to operate with a sensitive data scanning engine. In particular, a sensitive data reclassification engine can deployed on the cloud resource (e.g. via a sensitive data scanning engine agent) to support security posture management based on sensitive data reclassification operations. At step 104C, data items associated with the cloud resource are scanned. Scanning the cloud resource can include scanning the data items and identifying metadata associated with the data items. The metadata can be associated with a plurality of metadata types configured to be supported via the sensitive data scanning engine. In one implementation, scanning the data items and scanning the data items of metadata is performed simultaneously, such that, if the metadata of a scanned items needs to be evaluated, the metadata is readily available without the need to perform an addition scan operation.

At step 106C, a determination is made whether a confidence score of a scanned data item is above a first confidence threshold (e.g., a high watermark threshold). If the confidence score is above the first confidence threshold a data classification is assigned to the scanned data item, where the data classification indicates that the scanned data item is a sensitive data item. At step 108C, the sensitive data scanning engine exits-stops performing operations for the scanned data item.

At step 110C, a determination is made whether a confidence score of a scanned data item is below a second confidence threshold (i.e., a low watermark threshold). If the confidence score is below the second confidence threshold a data classification is assigned to the scanned data item, where the data classification indicates that the scanned data is not a sensitive data item. At step 112C, the sensitive data scanning engine exits-stops performing operations for the scanned data item.

At step 114C, a scanned data item that has a confidence score that is neither above the high watermark threshold nor below the low watermark threshold is identified. The scanned data item can be assigned a data classification that indicates that the scanned data item is potentially a sensitive data item. As such, a metadata model (i.e., a sensitive data confidence rescoring model) is used to re-score the confidence score of the scanned data item. In particular, metadata for the scanned data item is identified, and a determination is made whether the metadata of the scanned data item includes sensitive data attributes. The sensitive data attribute are employed in the metadata model to re-score the confidence score of the scanned data item.

At step 116C, a determination is made whether the re-scored confidence score of the scanned data item is outside of the first confidence score or the second confidence score. If the re-scored confidence score is above the first confidence score or below the second confidence score, a data classification of sensitive data item or not sensitive data item, respectively, is assigned to the scanned data item. If the re-scored sensitive confidence score is not outside the first confidence score or the second confidence score, then at step 118, the sensitive data scanning engine exits—stops performing operations for the scanned data item. The scanned data item can be assigned a data classification of inconclusive sensitive data item. Alternatively, the sensitive data scanning engine can request more information (e.g., additional metadata via rescanning of the data item) to further evaluate (e.g., re-score the confidence score) based on the additional metadata.

Figure 2A:
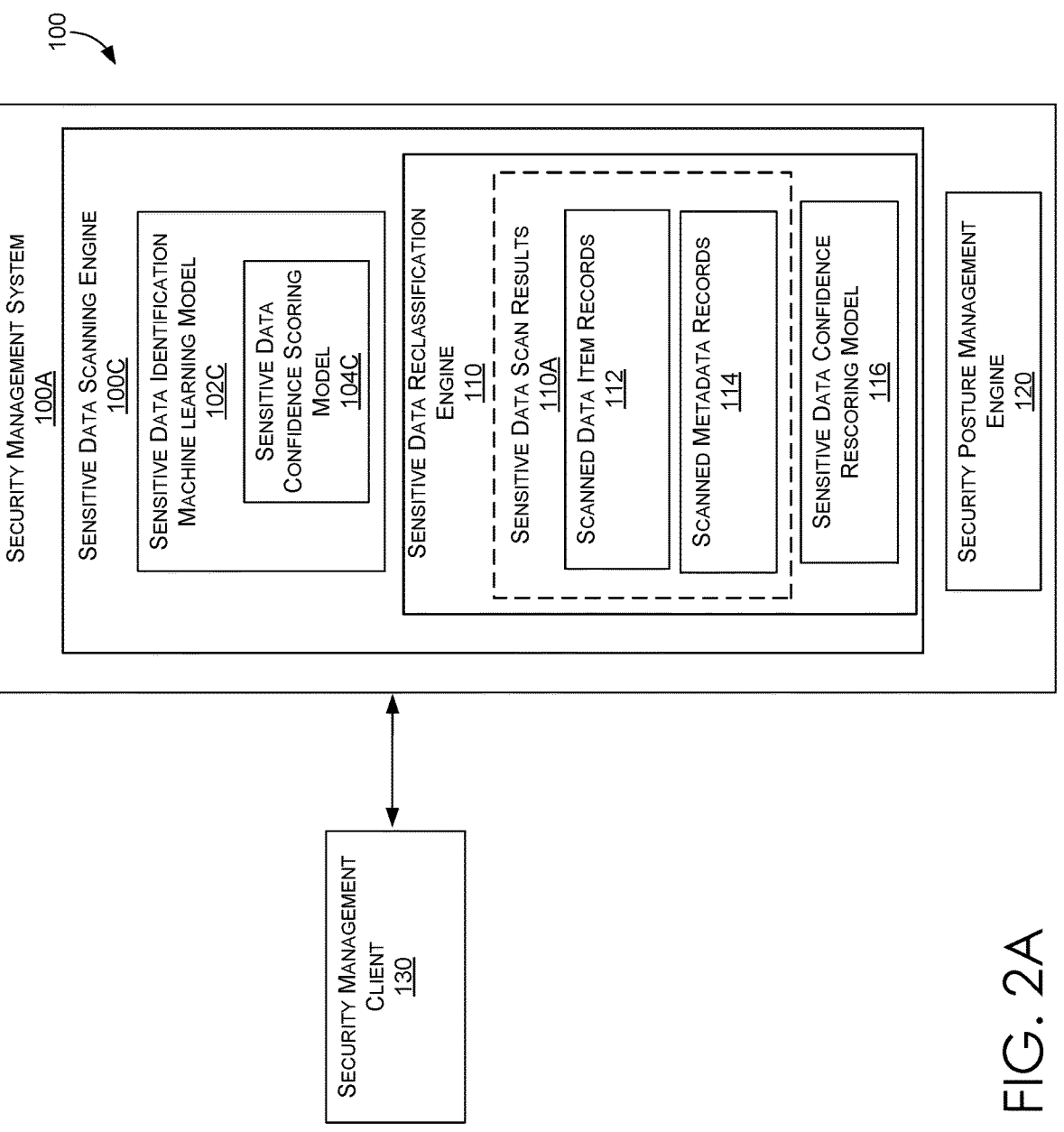
FIG. 2A is a block diagram of an exemplary security management system that includes a sensitive data reclassification engine, in accordance with aspects of the technology described herein.
Figure 2B:
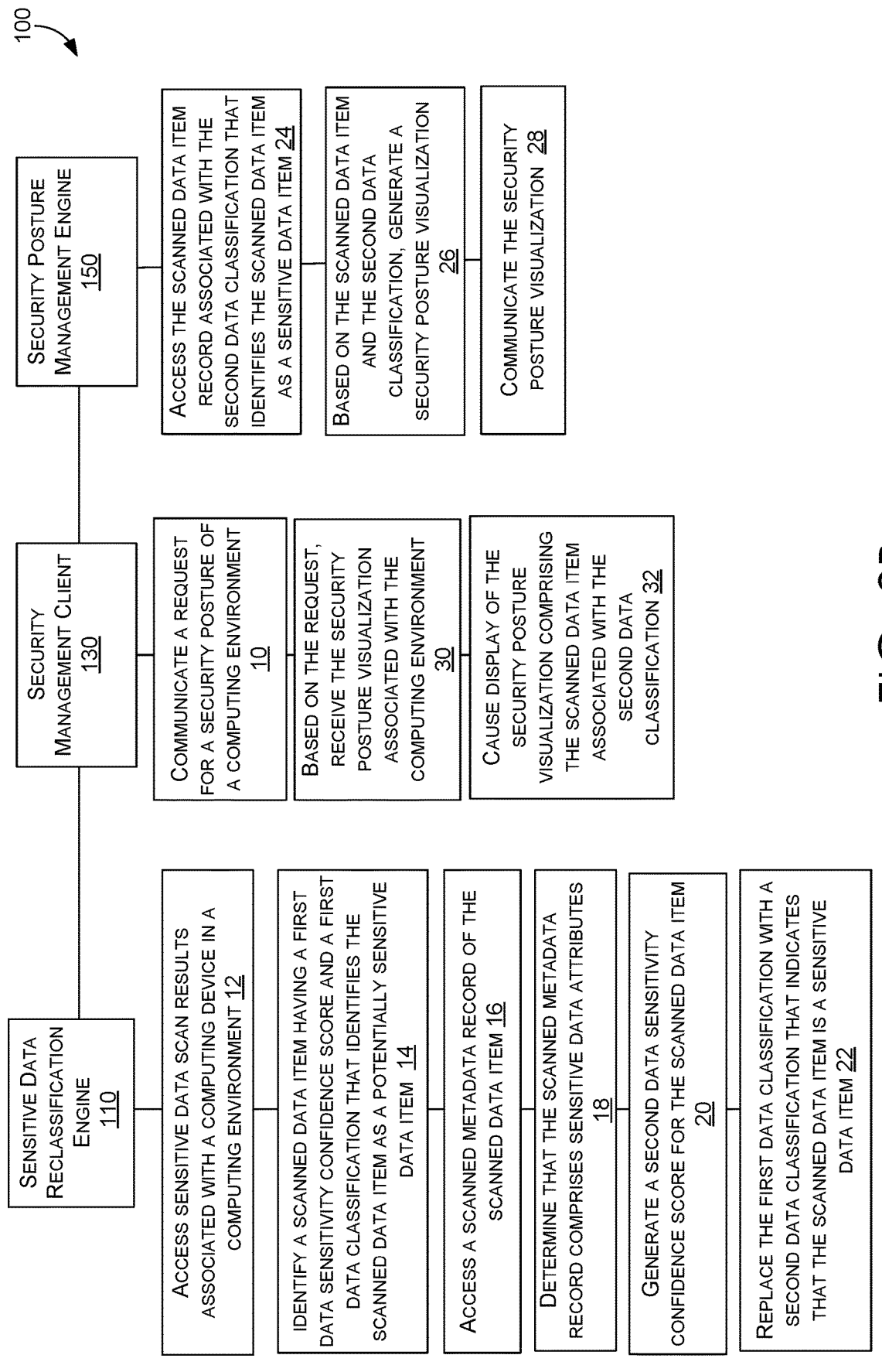
FIG. 2B is a block diagram of an exemplary security management system that includes a sensitive data reclassification engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example security management system 100 in which methods of the present disclosure may be employed. In particular, FIG. 2A shows a high level architecture of the security management system 100A in accordance with implementations of the present disclosure. Among other engines, managers, generators, selectors, or components not shown (collectively referred to herein as "components"), the technical solution environment of security management system 100 corresponds to FIGS. 1A and 1B.

With reference to FIG. 2A, FIG. 2A illustrates a security management system 100A having security management system 100A, sensitive data scanning engine 100C, sensitive data identification machine learning model 102C, sensitive data confidence score model 104C; sensitive data reclassification engine 110 having sensitive data scan results 110A including scanned data item records 112, scanned metadata item records 114; sensitive data confidence rescoring model 116, and security posture management engine 120.

The sensitive data reclassification engine 110 is responsible for reclassifying a data classification of a scanned data item based on metadata associated the scanned data item. The sensitive data reclassification engine 110 accesses sensitive data scan results 110A of a computing resource. The sensitive data scan results 110A include scanned data item records 112 and scanned metadata item records that are associated with the sensitive data scanning engine 100C that supports scanning data items for sensitive information.

The sensitive data scanning engine 100C can simultaneously scan data items for sensitive data and metadata of the data item. Some of the scanned data items can include metadata having sensitive data attributes. The sensitive data scanning engine 100C simultaneously scans data items for metadata associated with a plurality of metadata types. The plurality of metadata types are associated with generating updated data sensitivity confidence scores for scanned data items having metadata that include sensitive data attributes. The plurality of metadata types include explicit tags, actual names, access and flow patterns, and similarity to other resources.

The sensitive data scanning engine 100C further supports generating data sensitivity confidence score for scanned data item using the sensitive data identification machine learning model 102C and sensitive data confidence scoring model 104C. The sensitive data confidence scoring models can generate data sensitivity confidence scores without factoring metadata associated with the scanned data items. The sensitive data scanning engine 100C provides a first confidence threshold and a second confidence threshold. Scanned data items with data sensitivity confidence scores above the first confidence threshold are identified as sensitive data item and scanned data items with data sensitivity confidence scores below a second confidence threshold are identified as non-sensitive data items. In this way, the sensitive data scanning engine 110C supports a first plurality of scanned data items with data sensitivity confidence scores above a first confidence threshold, the first plurality of scanned data items are identified as sensitive data items; a second plurality of scanned data items with data sensitivity confidence scores below a second confidence threshold, the second plurality of scanned data items are identified as non-sensitive data items; and a third plurality of scanned items with data sensitivity confidence scores between the first confidence threshold and the second confidence threshold, the third plurality of scanned data items are identified as potentially sensitive data items.

The sensitive data reclassification engine 110 includes scanned data item records 112 having data classifications based on their corresponding data sensitivity confidence scores and scanned metadata records 114 that include sensitive data attributes of metadata that are mapped to scanned data items of the scanned data item records 112 that have a data classification that indicates that the scanned data items are potentially sensitive data item. The sensitive data reclassification engine 110 further includes a sensitive data confidence rescoring model 116 that supports generating updated data sensitivity confidence scores for scanned data items based on metadata of those items that include sensitive data attributes. The sensitive data confidence rescoring model is trained on one or more metadata types to generate a subsequent probability of data sensitivity based on sensitive data attributes associated with scanned metadata. In this way, the sensitive data confidence rescoring model 116 generates a second data sensitivity confidence score for a scanned data item based on rescoring the scanned data item The sensitive data reclassification engine 110, based on the sensitive data scan results, identifies a scanned data item having a first data sensitivity confidence score and a first data classification that indicates that the scanned data item is a potentially sensitive data item. Based on the scanned data item having the first data classification, the sensitive data reclassification engine 110 accesses a scanned metadata record of the scanned data item. The sensitive data reclassification engine 110 then determines that the scanned metadata record comprises a sensitive data attribute, and uses the sensitive data attribute to generate a second data sensitivity confidence score for the scanned data item. Based on the second data sensitivity score, the sensitive data reclassification engine 110 replaces the first data classification with a second data classification that indicates that the scanned data item is a sensitive data item.

A security posture visualization is communicated and caused to be displayed. The security posture visualization includes an identifier of the scanned data item associated with second data classification. The security posture visualization may include an alert associated with the scanned data item, where the alert is associated with a prioritization identifier and a remediation action. The prioritization identifier is based on the second data classification and the remediation action is executable to address a security threat associated with scanned data item.

The security management client 130 is responsible for communicating a request for a security posture of a computing environment, and based on the request, receives a security posture visualization associated with the computing environment, where the security posture visualization comprises the scanned data item; and causes display of the security posture visualization comprising the scanned data item associated with the second data classification. The security management client 130 can receive an indication to execute a remediation action associated with the scanned data item, where the remediation action is associated with the security posture visualization; and communicate the indication to execute the remediation action to cause execution of the remediation action.

With reference to FIG. 2B, FIG. 2B illustrates a security management system 100A having sensitive data reclassification engine 110, security management client 130, and security posture management engine 150. At block 10, the security management client 130 communicates a request for a security posture of a computing environment. At block 12, the sensitive data reclassification engine 110 accesses sensitive data scan results associated with a computing device in a computing environment; at block 14, identifies a scanned data item having a first data sensitivity confidence score and a first data classification that identifies the second data item as a potentially sensitive data item; at block 16 accesses a scanned metadata record of the scanned data item; at block 18, determines that the scanned metadata record comprises sensitive data attributes; at block 20, generates a second data sensitivity confidence score for the scanned data item; and at block 22, replace the first data classification with a second data classification that indicates that the scanned data item is a sensitive data item.

At block 24, the security posture management engine 150 accesses the scanned data item record associated with the second data classification that identifies the scanned data item as a sensitive data item; at block 26, based on the second data item and the second data classification, generate security posture visualization; and at block 28, communicate the security posture visualization. At block 30, the security management client 130, based on the request for the security posture of the computing environment, receives a security posture visualization associated with the computing environment. And, at block 32, the security management client 130 causes display of the security posture visualization comprising the scanned data item associated the second data classification.

Example Methods

With reference to FIGS. 3, 4, and 5, flow diagrams are provided illustrating methods for providing security posture management using a sensitive data reclassification engine in a security management system. The methods may be performed using the security management system described herein. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system or computing system).

Turning to FIG. 3, a flow diagram is provided that illustrates a method 300 for providing security posture management using a sensitive data reclassification engine in a security management system. At block 302, sensitive data scan results associated with a computing device in a computing environment is accessed. At block 304, based on the sensitive data scan results, a scanned data item having a first data sensitivity confidence score and a first data classification that indicates the scanned data item is a potentially sensitive data item is identified. At block 306, based on the scanned data item having the first data classification, scanned metadata record of the scanned data item is accessed. At block 308, a determination is made that the scanned metadata record comprises a sensitive data attribute. At block 310, using the sensitive data attribute, a second data sensitive confidence score for the scanned data item is generated. At block 312, based on the second data sensitivity confidence score associated with the sensitive data attribute and the scanned data item, the first data classification is replaced with a second data classification that indicates that the scanned data item is a sensitive data item. At block 314, a security posture visualization to cause display of the security posture visualization comprising an identifier of the scanned data item associated with the second data classification is communicated.

Turning to FIG. 4, a flow diagram is provided that illustrates a method 400 for providing security posture management using a sensitive data reclassification engine in a security management system. At block 402, a request for a security posture of a computing environment is communicated. At block 404, based on the request, a security posture visualization associated with the computing environment is received, the security posture visualization comprises an identifier of the scanned data item having a second data classification that replaced a first data classification that indicated that the scanned data item was a potentially sensitive data item. The second data classification indicates that the scanned data item is a sensitive data item. At block 406, the security posture visualization comprising the identifier of the scanned data item associated with the second data classification is caused to be displayed.

Turning to FIG. 5, a flow diagram is provided that illustrates a method 500 for providing security posture management using a sensitive data reclassification engine in a security management system. At block 502, a scanned metadata record of a scanned data item having a first data classification that indicates that the scanned data item is a potentially sensitive data item is accessed. At block 504, a determination is made that the scanned metadata record comprises a sensitive data attribute. At block 506, using a sensitive data confidence rescoring model and the sensitive data attribute, a second data sensitivity confidence score is generated based on rescoring the scanned data item having a first data sensitivity confidence score. At block 508, based on the second data sensitivity confidence score, the first data classification is replaced with a second data classification that indicates that the scanned data item is a sensitive data item.

Technical Improvement

Embodiments of the present technical solution have been described with reference to several inventive features (e.g., operations, systems, engines, and components) associated with a security management system. Inventive features described include: operations, interfaces, data structures, and arrangements of computing resources associated with providing the functionality described herein relative with reference to a sensitive data reclassification engine. Functionality of the embodiments of the present technical solution have further been described, by way of an implementation and anecdotal examples—to demonstrate that the operations (e.g., sensitive data scanning that includes searching for identifying, classifying, and reclassifying sensitive or confidential information within data) for providing the sensitive data reclassification engine. The sensitive data classification engine is as a solution to a specific problem (e.g., inaccurate data classification of data with sensitive or confidential information) in security management technology. The sensitive data reclassification engine improves computing operations associated with data classification accuracy of sensitive data and providing security posture information in security management systems. Overall, these improvements result in less CPU computation, smaller memory requirements, and increased flexibility in security management systems when compared to previous conventional security management system operations performed for similar functionality.

Additional Support for Detailed Description

Example Distributed Computing System Environment

Figure 6:
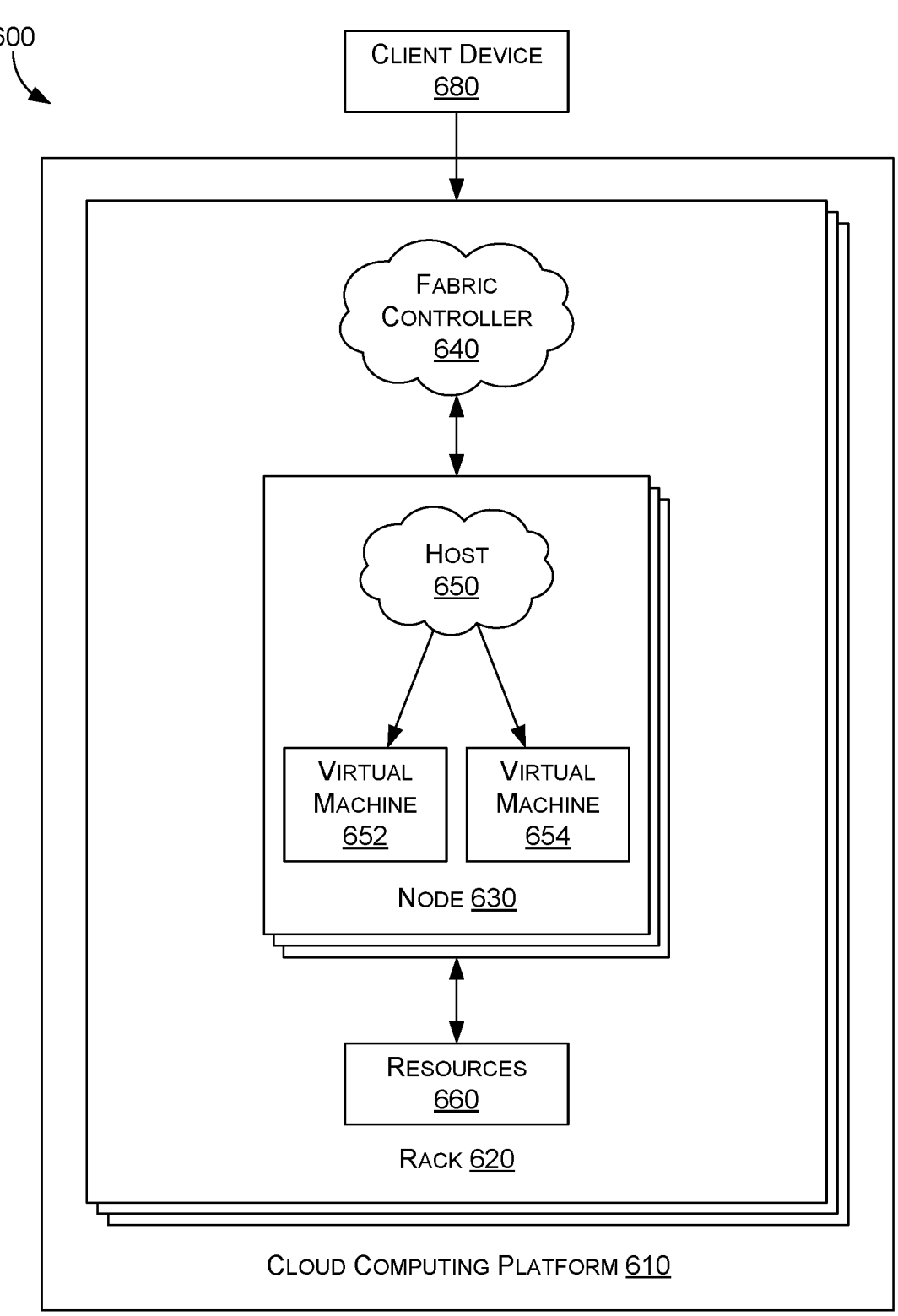
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs). Example Computing Environment Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
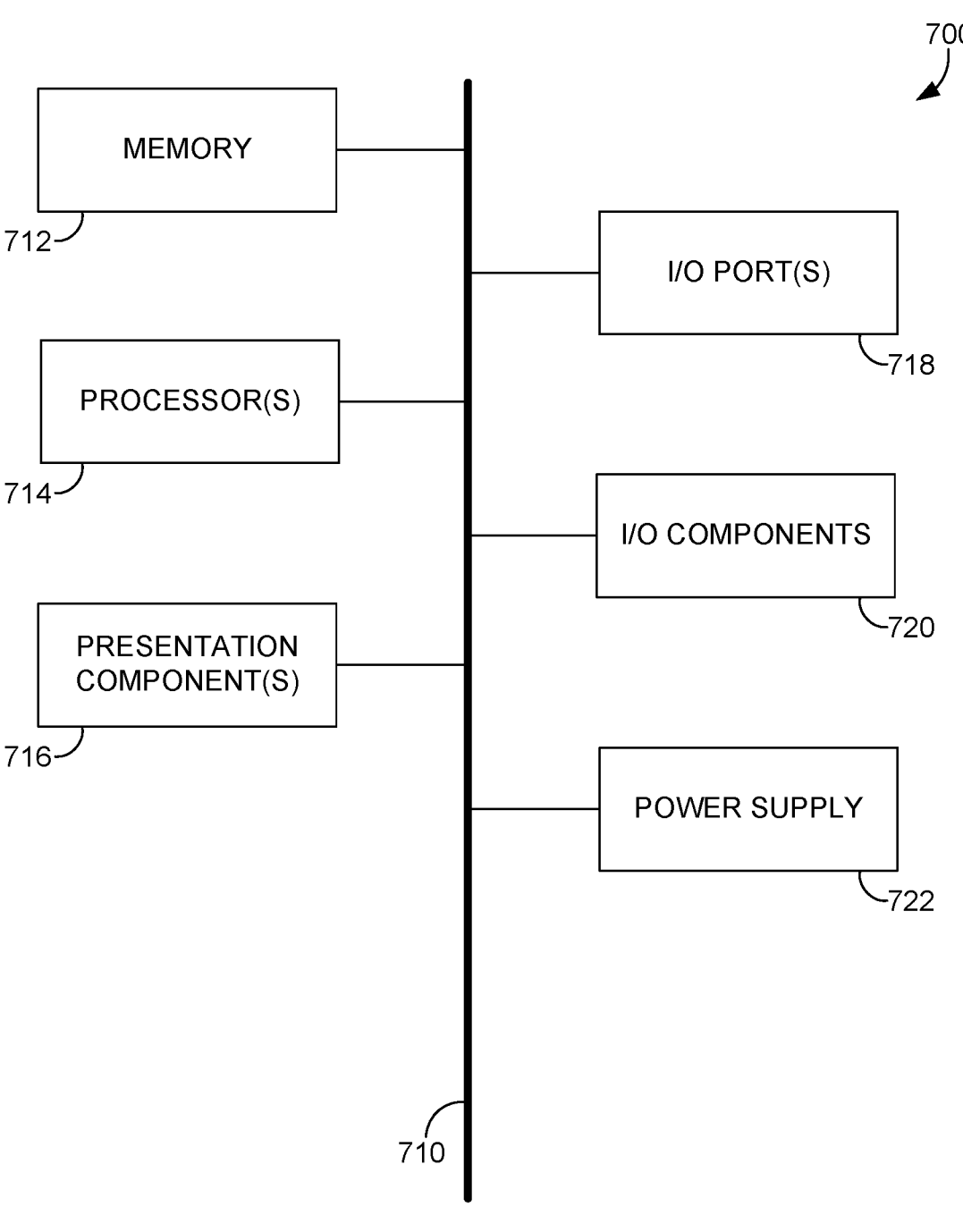
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving." or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors;
computer memory storing computer-useable instructions that, when used by the one or more computer processors, cause the one or more computer processors to perform operations, the operations comprising:
accessing sensitive data scan results associated with a computing device in a computing environment;
based on the sensitive data scan results, identifying a scanned data item having a first data sensitivity confidence score and a first data classification that indicates that the scanned data item is a potentially sensitive data item, wherein the scanned data item is further evaluated using a scanned metadata record of the scanned data item when the first data classification indicates that the scanned data item is the potentially sensitive data item;
based on the scanned data item having the first data classification, accessing the scanned metadata record of the scanned data item;
determining that the scanned metadata record comprises a sensitive data attribute;
using the sensitive data attribute, generating a second data sensitivity confidence score for the scanned data item, wherein generating the second data sensitivity confidence score comprises applying a sensitive data confidence rescoring model that is trained on one or more metadata types to generate a subsequent probability of data sensitivity based on one or more sensitive data attributes associated with scanned metadata;

based on the second data sensitivity confidence score, replacing the first data classification with a second data classification that indicates that the scanned data item is a sensitive data item; and communicating a security posture visualization to cause display of the security posture visualization comprising an identifier of the scanned data item associated with the second data classification.

2. The system of claim 1, wherein the sensitive data scan results are associated with a sensitive data scanning engine that supports scanning data items for sensitive information, the sensitive data scanning engine simultaneously scans data items for sensitive data and metadata associated with a plurality of metadata types, wherein the plurality of metadata types are associated with generating updated data sensitivity confidence scores for scanned data items having metadata that includes sensitive data attributes.

3. The system of claim 1, further comprising a first confidence threshold and a second confidence threshold, wherein scanned data items with confidence scores above the first confidence threshold are identified as sensitive data items, and scanned data items with data sensitivity confidence scores below the second confidence threshold are identified as non-sensitive data items.

4. The system of claim 1, further comprising a sensitive data reclassification engine including scanned metadata records that include sensitive data attributes of metadata that are mapped to scanned data items with the first data classification that indicates that the scanned data items are potentially sensitive data items.

5. The system of claim 1, further comprising:

a first plurality of scanned data items with data sensitivity confidence scores above a first confidence threshold, the first plurality of scanned data items are identified as sensitive data items;

a second plurality of scanned data items with data sensitivity confidence scores below a second confidence threshold, the second plurality of scanned data items are identified as non-sensitive data items; and a third plurality of scanned items with data sensitivity confidence scores between the first confidence threshold and the second confidence threshold, the third plurality of scanned data items are identified as potentially sensitive data items, the third plurality of scanned data items comprising the scanned data item.

6. The system of claim 1, wherein the one or more metadata types includes explicit tags, actual names, access and data flow patterns; and similarity to other resources.

7. The system of claim 1, wherein the sensitive data confidence rescoring model is trained on the one or more metadata types to generate the subsequent probability of data sensitivity based on sensitive data attributes associated with the scanned metadata.

8. The system of claim 1, wherein the security posture visualization comprises an alert associated with the scanned data item, wherein the alert is associated with a prioritization identifier and a remediation action, wherein the prioritization identifier is based on the second data classification and the remediation action is executable to address a security threat associated with the alert.

9. The system of claim 1, the operations further comprising:

communicating a request for a security posture of the computing environment;

based on the request, receiving a security posture visualization associated with the computing environment, wherein the security posture visualization comprises the scanned data item; and causing display of the security posture visualization comprising the identifier of the scanned data item associated with the second data classification.

10. The system of claim 1, the operations further comprising:

receiving an indication to execute a remediation action associated with the scanned data item, wherein the remediation action is associated with the security posture visualization; and communicating the indication to execute the remediation action to cause execution of the remediation action.

11. One or more computer-storage media having computer-executable instructions embodied thereon that, when executed by a computing system having a processor and memory, cause the processor to perform operations, the operations comprising:

communicating a request for a security posture of a computing environment;

based on the request, receiving a security posture visualization associated with the computing environment, wherein the security posture visualization comprises a scanned data item having a second data classification that replaced a first data classification that indicated that the scanned data item was a potentially sensitive data item, the second data classification indicates that the scanned data item is a sensitive data item, the second data classification is generated based on a generating a second data sensitivity confidence score of the scanned data item, wherein generating the second data sensitivity confidence score comprises applying a sensitive data confidence rescoring model that is trained on one or more metadata types to generate a subsequent probability of data sensitivity based on one or more sensitive data attributes associated with scanned metadata; and causing display of the security posture visualization comprising the scanned data item associated with the second data classification.

12. The media of claim 11, wherein the security posture visualization comprises an alert associated with the scanned data item, wherein the alert is associated with a prioritization identifier and a remediation action, wherein the prioritization identifier is based on the second data classification and the remediation action is executable to address a security threat associated with the alert.

13. The media of claim 11, the operations further comprising:

accessing a scanned metadata record of the scanned data item having a first data sensitivity confidence score and the first data classification;

determining that the scanned metadata record comprises a sensitive data attribute;

using the sensitive data confidence rescoring model and the sensitive data attribute, generating the second data sensitivity confidence score for the scanned data item based on rescoring the scanned data item having the first data sensitivity confidence score; and based on the second data sensitivity confidence score, replacing the first data classification with the second data classification.

14. The media of claim 13, wherein the sensitive data confidence rescoring model is trained on the one or more metadata types to generate the subsequent probability of data sensitivity based on sensitive data attributes associated with the scanned metadata.

15. The media of claim 11, the operations further comprising:

receiving an indication to execute a remediation action associated with the scanned data item, wherein the remediation action is associated with the security posture visualization; and communicating the indication to execute the remediation action to cause execution of the remediation action.

16. A computer-implemented method, the method comprising:

accessing scanned metadata of a scanned data item having a first data classification that indicates that the scanned data item is a potentially sensitive data item;

determining that the scanned metadata comprises a sensitive data attribute;

using a sensitive data confidence rescoring model and the sensitive data attribute, generating a second data sensitivity confidence score for the scanned data item based on rescoring the scanned data item having a first data sensitivity confidence score, wherein generating the second data sensitivity confidence score comprises applying the sensitive data confidence rescoring model that is trained on one or more metadata types to generate a subsequent probability of data sensitivity based on one or more sensitive data attributes associated with scanned metadata; and based on the second data sensitivity confidence score, replacing the first data classification with a second data classification that indicates that the scanned data item is a sensitive data item.

17. The method of claim 16, further comprising:

a first plurality of scanned data items with data sensitivity confidence scores above a first confidence threshold, the first plurality of scanned data items are identified as sensitive data items;

a second plurality of scanned data items with data sensitivity confidence scores below a second confidence threshold, the second plurality of scanned data items are identified as non-sensitive data items; and a third plurality of scanned items with data sensitivity confidence scores between the first confidence threshold and the second confidence threshold, the third plurality of scanned data items are identified as potentially sensitive data items, the third plurality of scanned data items comprising the scanned data item.

18. The method of claim 16, wherein the sensitive data confidence rescoring model is trained on the one or more metadata types to generate the subsequent probability of data sensitivity based on sensitive data attributes associated with the scanned metadata.

19. The method of claim 16, the method further comprising:

accessing the scanned data item associated with the second data classification that identifies classification;

based on the scanned data item and the second data classification, generating a security posture visualization; and communicating the security posture visualization comprising the scanned data item.

20. The method of claim 19, wherein the second data sensitivity confidence score is above a first confidence score threshold, wherein data items with data sensitivity confidences scores above the first confidence score threshold are assigned the second data classification that indicates that the data items are sensitive data items.

* * * * *